May 15, 1962 V. M. MUNICIO 3,034,222
FLUIDIZING DEVICE
Filed July 28, 1958 2 Sheets-Sheet 1

INVENTOR.
Vicente Martin
BY Municio
Michael S. Striker
Attorney

May 15, 1962 V. M. MUNICIO 3,034,222
FLUIDIZING DEVICE
Filed July 28, 1958 2 Sheets-Sheet 2

INVENTOR.
Vincente Martin
BY Municio
Michael S. Striker
Attorney

United States Patent Office 3,034,222
Patented May 15, 1962

3,034,222
FLUIDIZING DEVICE
Vicente Martin Municio, Madrid, Spain, assignor to Instituto Nacional de Industria, Madrid, Spain
Filed July 28, 1958, Ser. No. 751,468
Claims priority, application Spain July 29, 1957
3 Claims. (Cl. 34—57)

The present invention relates to a fluidizing device and, more particularly, it relates to a multi-stage fluidizing device.

Recent developments in fluidization technique, and particularly in the use of multi-stage fluidizing devices have given rise to certain problems connected with the downward transferal of solids from a higher fluidized bed to a lower fluidized bed. The difficulties connected with the transfer of sub-divided solids in a multi-stage fluidizing device from a higher bed to a lower bed are particularly serious when high temperatures are to be applied, and even more so when the fluidized material, be it the subdivided solids or the fluidizing gas, are capable of attacking, chemically or mechanically, the portions of the apparatus with which they come in contact, such as feeding ducts and overflow pipes. In such cases, i.e., particularly at high temperatures and with substances capable of attacking the apparatus, the use of transporting devices, containing moving parts such as worm gears or the like becomes uneconomical due to the great wear and tear involved requiring frequent repairs and replacements. On the other hand, the conventional overflow pipes such as for instance described in Perry's Chemical Engineers Handbook, 3rd edition, on page 1620, and which consist of simple straight vertical tubes of even diameter throughout, the upper end of which controls the height of the upper fluidized bed, and the bottom end of which is deeply submerged within the lower fluidized bed, do not offer a satisfactory solution to the problem of transferring sub-divided solids from the upper to the lower fluidized bed. Particular shortcomings of these overflow pipes are the lack of regularity and of adaptability to changing working conditions, as well as their short useful life span due to the abrasive action of the solid particles of the lower fluidized bed on the lower portion of the pipe. In order to properly operate a multi-stage fluidizing device wherein solid particles are transferred through the above described overflow pipes to a lower fluidized bed, it will be required that upward flow of gas through the overflow pipe has a pressure which is sufficiently low so that solid particles from the upper fluidized bed will be able to flow downwardly through the pipe against the upward stream of gas. For this reason, the lower portion of the overflow pipe must be immersed within the lower fluidized bed into which solid particles from the upper fluidized bed are to be transferred. Furthermore, it is essential for operation of this prior art device that the height of the overflow pipe is sufficient to permit formation within the same of a fluidized bed capable of effectively resisting the upward flow of gas through the overflow pipe.

Thus, the overflow pipes generally must be of very considerable height, depending on the resistance offered by the grills or perforated support members supporting the individual fluidized beds. Consequently, the distance between adjacent superposed fluidized beds has to be increased to such extent as is necessary for accommodating the long overflow pipes. Thereby, the size of the entire multi-stage fluidizing device is considerably increased and consequently also the costs of such devices.

It is therefore an object of the present invention to overcome the aforementioned difficulties and disadvantages connected with conventional arrangements for downwardly transferring sub-divided solids from an upper fluidized bed to a lower fluidized bed.

It is another object of the present invention to provide a multi-stage fluidizing device of simple and economical construction and which can be operated in a relatively simple manner.

It is a further object of the present invention to provide a multi-stage fluidizing device having relatively short overflow pipes but capable of effectively transferring solid particles from an upper fluidized bed to a lower fluidized bed.

It is yet another object of the present invention to provide a multi-stage fluidizing device including overflow pipes which will not be subject to excessive wear and tear.

It is still a further object of the present invention to provide a multi-stage fluidizing device having overflow pipes which terminate above the upper level of the lower fluidized bed, whereby in addition to other advantages, the danger of clogging of the pipe in its lower end portion due to the melting or softening of solid particles of the lower fluidized bed within the pipe, is avoided. This disadvantage, namely the clogging of the overflow pipes is frequently experienced when sulfides are to be treated in a roasting furnace of the multi-stage fluidized bed type.

It is yet a further object of the present invention to provide a multi-stage fluidizing device wherein the individual superposed fluidized beds are arranged at a relatively short vertical distance from each other.

Other objects and advantages of the present invention will become apparent from a further reading of the description and the appended claims.

With the above and other objects in view, the present invention broadly comprises in a multi-stage fluidizing device, in combination, a housing, at least two perforated transversal support members arranged in the housing spaced vertically apart from each other and each adapted to support a fluidized bed of subdivided material; means for maintaining the fluidized bed on the lower one of the support members at a predetermined level, and an overflow pipe being open at both ends and reaching from a point above the upper one of the support members to a point below the upper one of the support members located above the predetermined level, the overflow pipe having in the region of its lower end a portion of restricted open cross section being smaller than the cross section of the pipe at any point above the portion of restricted cross-section, whereby fluidization of subdivided material flowing downwardly through the overflow pipe will be prevented at least when the overflow pipe is substantially filled with the material.

According to one of several preferred embodiments of the present invention, the same comprises in a multi-stage fluidizing device, in combination, a housing, at least two perforated transversal support members arranged in the housing spaced vertically apart from each other and each adapted to support a fluidized bed of subdivided material, means for maintaining the fluidized bed on the lower one of the support members at a predetermined level, an overflow pipe being open at both ends and reaching from a point above the upper one of the support members to a point below the upper one of the support members located above the predetermined level, and means associated with the lower end portion of the overflow pipe for reducing the cross section through which gas may flow upwardly into the main portion of the overflow pipe so as to cause a pressure drop in gas flowing upwardly through the overflow pipe, the means including an upwardly flaring frusto-conically shaped nozzle attached at its upper end to the lower end portion of the overflow pipe, the inner cross section of the upper end of the nozzle and of the lower end portion of the overflow pipe being substantially congruent, whereby fluidization of subdivided material flowing downwardly through the overflow pipe will be prevented at least when the overflow pipe is substantially filled with the material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 8:
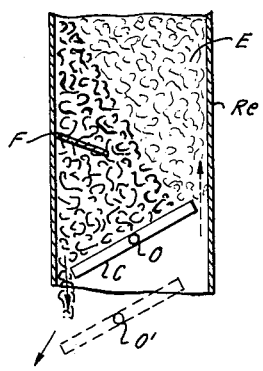
Figure 9:
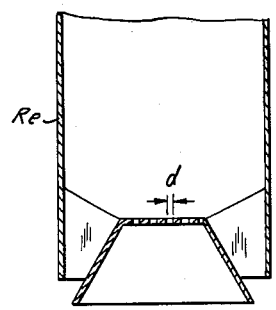

FIG. 8 is a schematic elevational view in cross section of the lower end portion of an overflow pipe, provided with a different means, according to the present invention, for reducing the cross section of the overflow pipe through which fluid may flow upwardly from the lower fluidized bed; and FIG. 9 is yet a further embodiment of the nozzle portion of an overflow pipe according to the present invention, shown in schematic, elevational cross section.

Figure 1:
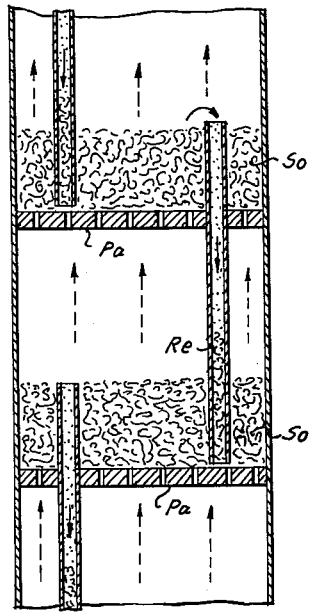
FIG. 1 is a fragmentary schematic illustration in elevational cross section of a multi-stage fluidizing device.

Referring now to the drawing and particularly to FIGURE 1, two vertically spaced supporting grills or perforated transversal support members $Pa$ are shown in a housing. Each of the supporting members $Pa$ is adapted to support a fluidized bed of subdivided material $So$. The flow of solids from the upper fluidized bed $So$ to the lower fluidized bed $So$ through conventional overflow pipe $Re$ is indicated in FIGURE 1 by continuous line arrows, while the upward flow of gas is indicated by broken line arrows.

Figure 2:
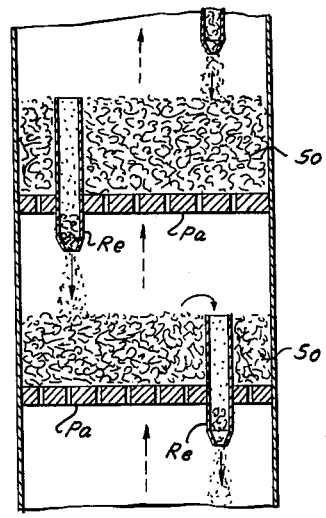
FIG. 2 is a fragmentary schematic illustration corresponding to what is shown in FIG. 1, however, provided with overflow pipes according to the present invention.

Comparing now what is shown in FIGURE 1 with FIGURE 2, it will readily be seen that the distance between perforated supporting members $Pa$ has been reduced and that overflow pipes $Re$ terminate with their lower end portion above the level of lower fluidized bed $So$. It should be noted from the outset that for sake of clarity and simplicity all of the pipes illustrated in the drawings may be assumed to be of circular cross section. However, the horizontal cross section of the overflow pipes may be of circular, elliptic, polygonal, or any other desired configuration without deviating from the scope of the present invention.

Referring now again to the comparison of FIGURES 1 and 2, it will be seen that the long overflow pipes $Re$ of FIGURE 1 have been replaced in FIGURE 2 with considerably shorter overflow pipes $Re$ which terminate in an end portion of reduced cross section located above the upper level of the lower fluidized bed.

According to the present invention, as illustrated in FIGURE 2, the cross sectional area at the lower end portion of overflow pipes $Re$ is reduced or restricted to a cross section which is smaller than the cross section of the overflow pipe at any point above the area of restricted cross section. This area of restricted cross section or obstructing means resulting in such area, serve to reduce the pressure of gas passing upwardly from the lower fluidized bed through the overflow pipe. A relatively narrow stream of gas is admitted through the reduced cross section at the lower end portion of the overflow pipe and is allowed to expand while passing upwardly through the overflow pipe. Thereby, the pressure of the gas is reduced substantially in proportion to the increase of the cross-sectional area of the pipe. According to FIGURE 2 the obstructing means or the means associated with the lower end portion of the overflow pipe consist essentially in an upwardly flaring frustoconically shaped nozzle which is attached to or preferably integral with the lower end portion of the overflow pipe. Preferably the inner cross section of the upper end of the frusto-conically shaped nozzle and the inner cross section of the adjacent lower end of the overflow pipe are of identical shape and dimensions.

Figure 3:
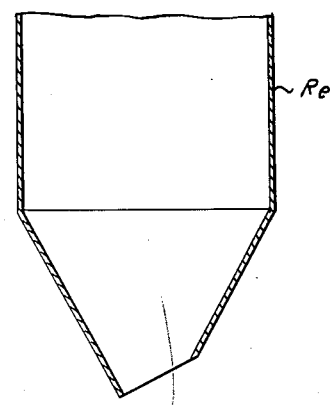
FIG. 3 is a schematic, elevational view in cross section of the nozzle portion of an overflow pipe according to the present invention.

As illustrated in FIGURE 3, the open lower end of the frusto-conical nozzle may not define a horizontal plane but may be inclined against the horizontal.

Thus, the overflow pipe according to the present invention will cause a pressure drop in the gas streaming upwardly through the same which will result in a reduction of the speed of flow of the upwardly streaming fluid to a value which is smaller than the downward speed or the "pneumatic" dragging rate of the solid particles which are conveyed through the overflow pipe from an upper fluidized bed to a lower fluidized bed by force of gravity. No additional means or devices are required to thus accomplish the downward transfer of solid particles in an efficient and easily controllable manner.

Figure 4:
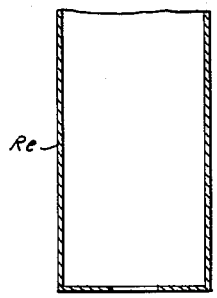
FIG. 4 is a schematic elevational view in cross section of another embodiment of a nozzle portion according to the present invention.
Figure 5:
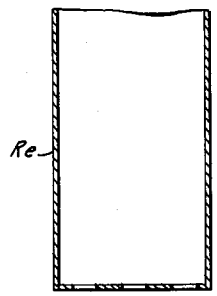
FIG. 5 is a schematic elevational view in cross section of yet another embodiment of a nozzle portion according to the present invention.

FIGURES 4 and 5 illustrate a different embodiment of overflow pipe end portions of reduced open cross section. According to these figures, the open cross section of overflow pipe $Re$ is reduced by closing of the lower end of the same with a perforated plate which, according to FIGURE 4, may be formed with one relatively large center hole, or, according to FIGURE 5, with a plurality of relatively smaller perforations.

Figure 6:
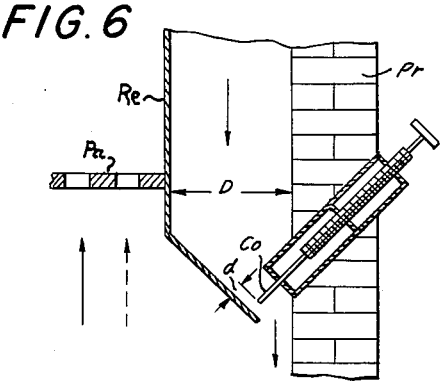
FIG. 6 is a fragmentary, schematic, elevational view in cross section of the lower portion of an overflow pipe provided with an adjustable obstruction means at its lower outlet end.

Referring now to FIGURE 6, a different means of reducing the open cross section of the lower end portion of overflow pipe $Re$ is shown. The embodiment illustrated in FIG. 6 is particularly advantageous when frequent adjustments of the ratio between the full cross sectional area $D$ and the reduced cross sectional area $d$ are required. As shown in FIG. 6, the means for reducing the cross section of the lower portion of the overflow pipe comprise essentially a gate valve $Co$ operated by a hand rail located outside of the fluidizing device, by means of which the open cross sectional area of the lower portion of the overflow pipe can be adjusted to any desired value. The arrangement illustrated in FIG. 6 is particularly useful in such cases where fluidizing devices such as fluidizing furnaces have to operate with great variations in the feeding rate or operating conditions. Whenever the position of the gate valve is such as shown in FIG. 6, the upward flow of fluid through the overflow pipe is partially obstructed not only due to the pressure drop and reduction in the speed of flow of the gas caused by the increase in the cross section of the overflow pipe in upward direction from $d$ to $D$, but also by the angle relative to the vertical at which the fluid passes through the area of reduced cross section into the main portion of the overflow pipe.

Figure 7:
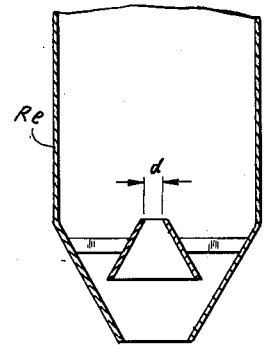
FIG. 7 is a schematic elevational view in cross section of still another embodiment of an overflow pipe nozzle portion according to the present invention.

A very efficient embodiment of the present invention is shown in FIG. 7, in which the materials passing through the overflow pipe are subjected to the effects caused by two juxtaposed areas of frusto-conical configuration flaring in opposite directions. Thus, according to the embodiment shown in FIGURE 7, solid particles will have a tendency to pass downwardly through the overflow pipe in the vicinity of the periphery of the same, due to the fact that the inner downwardly flaring cone acts as a flow guide for the upwardly streaming fluid which will thus flow primarily through the center portion of the pipe. The fluid passing upwardly through reduced cross section $d$ will create in contact with solid particles piled up above the level of $d$ a so-called eruptive bed, and the solids of the eruptive bed will be gradually discharged downwardly through the annular space between the two cones.

According to the embodiment illustrated in FIGURE 8, solid particles will pile up in the area F from where the solid particles will fall by force of gravity through the open space between the wall of the overflow pipe and the lower portion of valve C, while at the same time fluid will rise through the open space between the wall of the overflow pipe and the upper portion of valve C. Thereby an eruptive bed will be created in the area E. Adjustment of valve C will allow any desired control of the downward flow of solids and the upward flow of fluid, by turning valve C about its horizontal axis O. The open cross sectional areas between the lower and upper portions of valve C respectively and the wall of the overflow pipe, and particularly between the upper portion of valve C and the wall of overflow pipe R$e$, in relation to the size of the cross sectional area of the unobstructed upper portion of overflow pipe R$e$ are the regulating factors in this case. Valve C can easily be controlled from the outside of the fluidizing device by suitable spindle and hand rail arrangements or the like, well known in the art and not illustrated in the drawing.

It is also within the scope of the present invention to arrange the valve below the lower end of overflow pipe R$e$. This is indicated in FIGURE 8 in which the lower position of the valve is indicated in dotted lines and the control spindle for the lower valves as O'. The advantages with respect to nullifying the dynamic force of the fluid, which are obtained by arranging the valve as indicated in dotted lines in FIGURE 8, are somewhat similar to the advantages obtained according to the embodiment illustrated in FIGURE 6. It is also possible to arrange in association with one overflow pipe a plurality of valves, for instance two valves located as indicated in solid and dotted lines in FIGURE 8. This multi-valve arrangement is indicated in cases where very considerable drop in the pressure of the upwardly flowing fluid is desired. When a plurality of valves are used, all but the lowermost valve can be placed in a fixed position and the speed of downward discharge of solid particles can be controlled by suitable adjustment of the lowermost valve by means of spindle O'.

The embodiment illustrated in FIGURE 9 is somewhat related to the embodiment shown in FIGURE 7, inasmuch as it enables the solid particles to fall downwardly through an annular space formed by the external surface of the downwardly flaring cone and by the internal surface of cylindrical overflow pipe R$e$. The upward flow of gases is directed through the downwardly flaring truncated cone, the upper smaller end of which is partially closed by a perforated plate. The open restricted diameter can thus be modified or controlled by either inserting or omitting the plate in the upper opening of the truncated cone, or by exchanging plates having varying numbers of perforations or perforations of varying diameters so as to control the free restricted area through which the gas must flow prior to expanding in the portion of the overflow pipe of unrestricted cross section.

Fluidizing reactors of any type can be advantageously provided with the overflow pipes according to the present invention and can then be operated without requiring most of the additional care such as priming or repeated shutting down, etc., such as was required up to now. This is due to the fact that when in the device according to the present invention, solid particles begin to overflow, they are gradually held back by the upwardly flowing stream of fluid in the overflow pipe, within which a so-called eruptive-type bed is thus formed, the height of which increases up to the point where further upward flow and circulation of gas is completely avoided. Thereafter, a downward falling of the solid particles takes place in a similar manner as if a liquid would flow downwardly and the rated amount is thus reacted. When feeding of the furnace is terminated, no further solid particles enter the upper end of the overflow pipe and consequently, the level of solids within the pipe decreases until fluid starts again to flow upwardly through the overflow pipe, whereupon the downward flow of solid particles immedaitely stops. Consequently, the feeding of the entire device may be increased without causing any appreciable variation in the downward flow of solids, due to the above-described self-regulating effect of the apparatus according to the present invention.

The present invention is not limited to any type of construction materials which may be used for the overflow pipe or for the entire fluidizing device. The overflow pipe, for instance, may be made of metal or of refractory material, in which latter case, particularly if the overflow pipe is made of refractory bricks, it might be advisable to bind the same to the wall of the fluidizing furnace.

It is also within the scope of the present invention to arrange the overflow pipes at an angle against the vertical. The degree of inclination of the overflow pipes is limited by the angle at which solid particles will no longer slide down under the influence of the force of gravity. Accordingly, the maximum inclination of the overflow pipe against a vertical line will be one equal to an angle complementary to the slot angle of the particular solid particles which are to be transferred through the overflow pipe.

The following example is given as illustrative only of the present invention, the invention itself, however, not being limited to the specific details of the example.

*Example*

A fluidization device such as has been described in the specification is to be used for the drying of a moist substance whose characteristics are given further in this example.

The device looks like FIG. 2 shows and, in order to simplify, we suppose it composed by only two beds whether the number of beds can be more, as it is well known. The total height of the device is 1.60 m. and the inner diameter is 150 cm. Each of the two beds of the device is formed over a supporting grill which is provided with a number of holes (N) and is pierced by a side overflow pipe 80 cm. high, 40 cm. of which are above the grill.

Both the diameters of the pipe (D) and of the nozzle ($d$) are related with the characteristics of the holes in the following way:

| Pipe diameter, D (cm.) | Nozzle diameter, $d$ (cm.) | Number of holes in the grill | | Diameter of the holes, $d_n$ (cm.) |
|---|---|---|---|---|
| | | Maximum | Minimum | |
| 16 | 2 | 6,500 | 1,623 | 1 2 |
| 24 | 3 | 6,184 | 1,543 | 1 2 |
| 32 | 4 | 5,726 | 1,431 | 1 2 |

The grills and the device itself can be made of iron, stainless steel, refractory matter, plastics, etc., this depending on the temperature range and on the corrosive action of gases (if any), etc.

The maximum height between beds is equal to twice the height of the fluidized bed.

The nozzle is joined to the pipe by screwing it or by welding it, or a single pipe and nozzle may be made of cast material.

The operation of the device is as follows: The moist substance, whose density is 2 gr./cm.$^3$ and whose average grain-size of particles is 0.476 cm., is introduced through the higher part of the device at a rate which is slightly lower than the one necessary for the flood of the overflow pipe. For example, this feeding rate may be comprised between 0 and 4 Tns./day when the pipe is a refractory-type one. A stream of atmospheric air at temperature of 20° C. and pressure of 1 atm., is simultaneously blown through the side bottom of the device, so that a medium rate of fluidization of 20 cm./seg. is obtained whenever the porosity of the bed is equal to 0.8. (The limit rate of fluidization able to be used, by surpassing which the particles should be dragged out, is of 100 cm./seg.)

Under such conditions, the height of the fluidized bed is 40 cm. whenever the inner diameter of the device is 150 cm.

The solid particles are maintained in the so-called "turbulent suspension" or fluidized state by the action of the upwards stream of air, which dries the solid by taking its moisture with it. The said particles, after remaining during some time in the upper bed (whose length depends on the feeding rate), gradually become partially dried, and then fall through the overflow pipe where they easily succeed in overcoming the pressure of the upward gas, due to the special arrangement of the nozzle, on the opposite as happens through the grill holes, where the air stream does not find any difficulty to crossing so that the solid particles do not fall thereinto, but are maintained in fluidized state.

Once in the lower bed, the solid particles loose their remaining moisture by the action of the air stream coming into the device through the side bottom of the lower bed.

Once the solid is dry, its removal is achieved through the bottom of the device.

The device of our own may be used for several aims and purposes according to the fluidizing technique and by coupling the conditions of operation in such a way that they comply with the specific requirements on each case.

It will be understood that each of the elements described above, or two or more together, may also find a useful application in other types of fluidizing devices differing from the types described above.

While the invention has been illustrated and described as embodied in a multi-stage fluidizing device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a multi-stage fluidizing device, in combination, a housing; at least two perforated transversal support members arranged in said housing spaced vertically apart from each other and each adapted to support a fluidized bed of subdivided material; means for maintaining the fluidized bed on the lower one of said support members at a predetermined level; an overflow pipe being open at both ends and reaching from a point above the upper one of said support members to a point below said upper one of said support members located above said predetermined level; and nozzle means associated with the lower end portion of said overflow pipe for reducing the cross section through which gas may flow upwardly into the main portion of said overflow pipe so as to cause a pressure drop in gas flowing upwardly through said overflow pipe, said nozzle means including an upwardly flaring frusto-conical nozzle and a downwardly flaring frusto-conical nozzle substantially located within said upwardly flaring nozzle peripherally spaced from the latter, whereby fluidization of subdivided material flowing downwardly through said overflow pipe will be prevented at least when said overflow pipe is substantially filled with said material.

2. In a multi-stage fluidizing device, in combination, a housing; at least two perforated transversal support members arranged in said housing spaced vertically apart from each other and each adapted to support a fluidized bed of subdivided material; means for maintaining the fluidized bed on the lower one of said support members at a predetermined level; an overflow pipe being open at both ends and reaching from a point above the upper one of said support members to a point below said upper one of said support members located above said predetermined level; and nozzle means associated with the lower end portion of said overflow pipe for reducing the cross section through which gas may flow upwardly into the main portion of said overflow pipe so as to cause a pressure drop in gas flowing upwardly through said overflow pipe, said nozzle means including a downwardly flaring frusto-conical nozzle having an upper end portion extending into the lower end portion of said overflow pipe peripherally spaced from the latter and having a cross section smaller than the cross section of said lower end portion of said overflow pipe, whereby fluidization of subdivided material flowing downwardly through said overflow pipe will be prevented at least when said overflow pipe is substantially filled with said material.

3. In a multi-stage fluidizing device, in combination, a housing; at least two perforated transversal support members arranged in said housing spaced vertically apart from each other and each adapted to support a fluidized bed of subdivided material; means for maintaining the fluidized bed on the lower one of said support members at a predetermined level; an overflow pipe being open at both ends and reaching from a point above the upper one of said support members to a point below said upper one of said support members located above said predetermined level; and means associated with the lower end portion of said overflow pipe for reducing the cross section through which gas may flow upwardly into the main portion of said overflow pipe so as to cause a pressure drop in gas flowing upwardly through said overflow pipe, said means including a frusto-conically shaped downwardly flaring nozzle attached to the lower end portion of said overflow pipe and including a perforated member extending at least partially across said nozzle in the region of its narrower end portion, and peripherally spaced therefrom, whereby fluidization of subdivided material flowing downwardly through said overflow pipe will be prevented at least when said overflow pipe is substantially filled with said material.

References Cited in the file of this patent

UNITED STATES PATENTS

| | | |
|---|---|---|
| 2,471,064 | Hall et al. | May 24, 1949 |
| 2,509,751 | Watson | May 30, 1950 |
| 2,676,668 | Lindsay | Apr. 27, 1954 |
| 2,702,742 | Hillard | Feb. 22, 1955 |
| 2,715,282 | Niven | Aug. 16, 1955 |
| 2,925,330 | Knops | Feb. 16, 1960 |